Aug. 2, 1966 R. R. ALEXANDER 3,263,719
MULTI-HEADED WAFERIZER
Filed Feb. 12, 1964 2 Sheets-Sheet 1
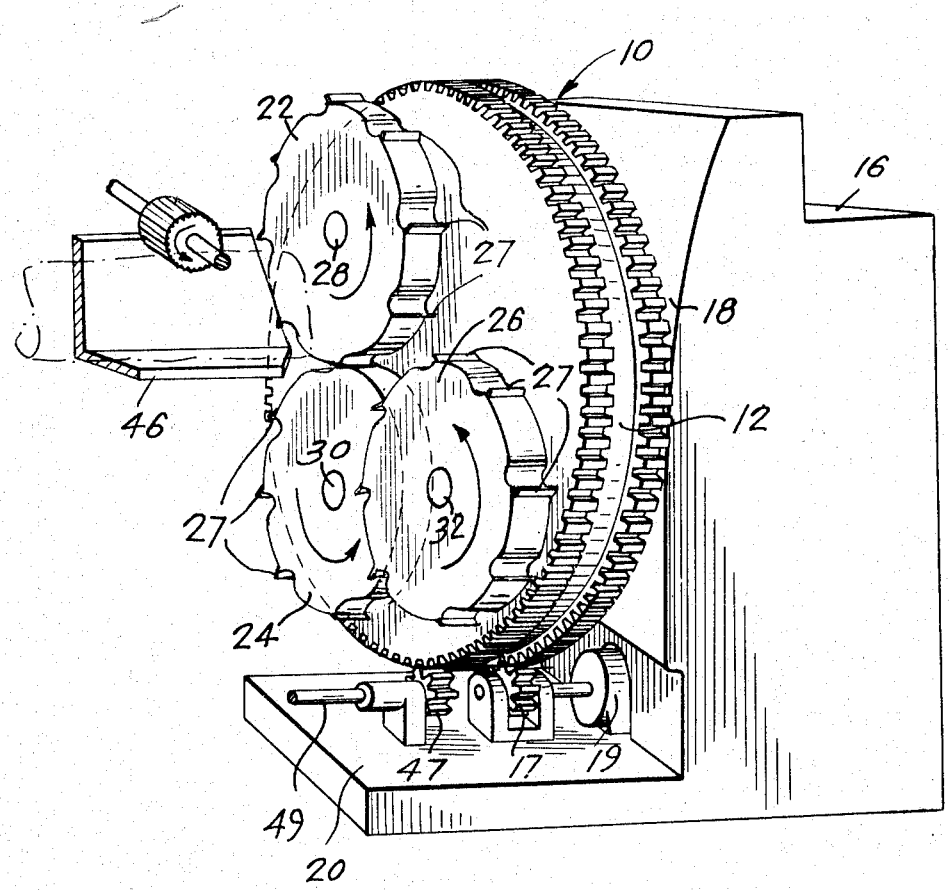
Fig. 1
INVENTOR
Ronald Rouleau ALEXANDER
AGENT INVENTOR
Ronald Rouleau ALEXANDER

AGENT

3,263,719
MULTI-HEADED WAFERIZER
Ronald Rouleau Alexander, Outremont, Quebec, Canada, assignor to Dominion Tar & Chemical Company, Limited, Montreal, Quebec, Canada
Filed Feb. 12, 1964, Ser. No. 344,307
12 Claims. (Cl. 144—176)

This invention relates to wood waferers, in particular to continuous wafer cutting machines.

It is presently known to produce wafers from bolts, but the procedure involved requires logs to be cut to length before feeding to the waferers. With these known machines, logs are fed to the drum from a hopper usually provided with driven side walls such as chain assemblies to aid gravity in forcing logs onto the cutting drum. The requirements for cutting the logs to pre-determined lengths, aligning and loading these logs into the hoppers, the complex hopper mechanism and the limited capacity of these waferers present serious disadvantages.

It is thus an object of this invention to provide a machine for continuously reducing wood into wafers or flakes.

It is a further object of the invention to provide a waferer that will handle tree length logs.

Further objects, features and advantages will be apparent from the following detailed description taken in conjunction with the accompanying drawings in which:

FIG. 1 is a general schematic layout of the present waferer.

Broadly, the present invention contemplates a multi-head waferer in which the heads rotate and simultaneously travel transversely of the material and longitudinally with the material as it is cut.

Figure 2:
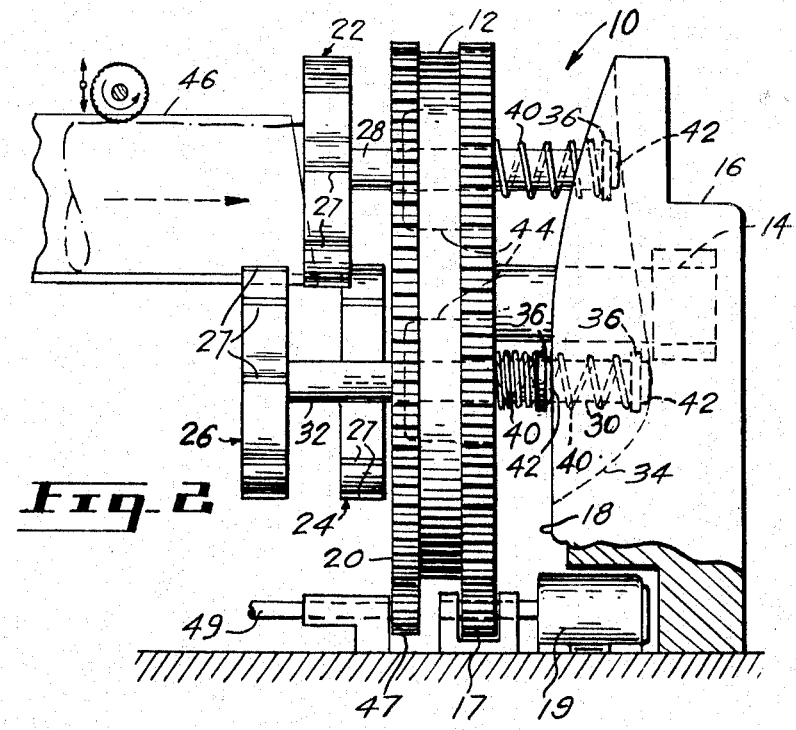
FIG. 2 is a schematic end view of the present invention.

Referring to the drawings, the waferer 10 is composed of a main drum 12 cantilevered for rotation on a horizontal axle 14 (see FIG. 2) which is mounted in bearings in the housing 16. The front face of the housing 16 has a cam surface provided thereon as will be explained in detail hereinafter. Drum 12 may be driven by any suitable means, as for example, a pinion 17 and motor 19 through a suitable reducing mechanism.

Projecting beyond the front face 20 of the drum 12 are a plurality (3 in the embodiment illustrated) of cutting heads 22, 24, and 26 rigidly mounted to rotate and move with shafts 28, 30 and 32 respectively. Each of these shafts extend through the drum 12 and engage the cam 34 on the face 18 of housing 16. Collars such as those indicated at 36 extend around and are anchored to each of the shafts 28, 30 and 32. Between each of these collars 36 and the rear face 38 of the drum 12, is a spring 40 which urges the ends 42 of shafts 28, 30 and 32 into firm contact with the cam 34. The ends of these shafts are, of course, formed into suitable cam followers for the type of cam used. Thus, as the drum 12 rotates about axle 14, the shafts 28, 30 and 32 and thus the heads 22, 24, and 26 are also rotated about shaft 14 and are moved longitudinally of the axle 14 under control of the cam surface 34. Each of the heads 22, 24, and 26 are provided with a plurality of knives 27.

Each of the shafts 28, 30 and 32 are suitably splined for sliding engagement with the armatures of synchronous motors 44. The housings of the motors 44 are fixedly mounted in the drum 12 and a source of power is provided for these motors via slip rings or the like. The r.p.m. of these motors determines the speed of the machine as will be pointed more particularly hereinbelow.

A suitable guide means such as the trough 46 directs the logs into the path of the various heads 22, 24 and 26. Feed means (not shown) continuously advance the logs into the waferer at a speed controlled in accordance with the movement of the cutting heads 22, 24 and 26. It is preferred to drive this feed means directly from the drum 12 through means as, for example, a shaft 49 driven from drum 12 by a gear 47. This shaft 49 in turn is connected in a suitable manner to drive the log feed means. With this type of arrangement, a change of speed of drum 12 will change the feed of the log and the advance of the log will therefore be a function of the speed of rotation of the drum. Also, the longitudinal advance of each head 22, 24 or 26, while cutting, is governed by the slope of cam 34 and the speed of rotation of drum 12 and thus is also a function of the speed of rotation of the drum.

As indicated above, the speed of rotation of the heads 22, 24 or 26 determines the overall speed of the machine. Before a head can advance through a log it must reduce the size of the log by slicing wafers therefrom. Thus, if the log is reduced at a slower rate the head must advance at this slower rate and the drum 12 must rotate at this slower rate since the advance of the heads is governed by the speed of rotation of the drum 12. When the drum 12 is caused to rotate at a slower speed, the feed of the log and the advance of the cutting head are correspondingly reduced since each is a function of the speed of the drum. The drive to the drum 12 should be flexible to allow these speed changes and therefore a motor and a fluid clutch or the like type drive is preferred. This type of drive allows slippage when a head does not reduce the log at the usual rate because of knife damage or the like.

Thus, the cutting speed of the individual heads 22, 24 and 26 driven by synchronous motors 44 determines the speed of rotation of the drum 12 which in turn determines the rate of axial movement of the heads via cam 34 and the rate of longitudinal advance of the log through gear 47 and shaft 49.

Figure 3:
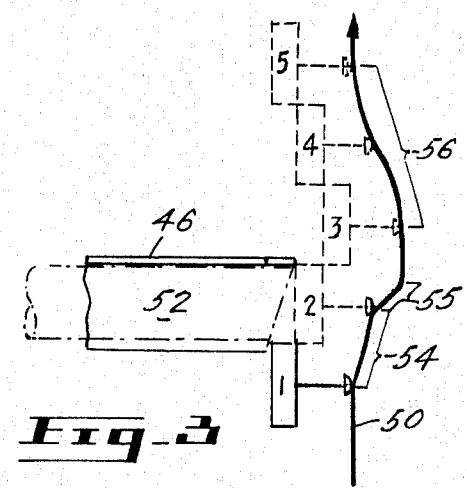
FIG. 3 illustrates the movement of the heads.

The longitudinal movement of the heads 22, 24 and 26 will now be explained in greater detail with reference to FIG. 3.

Cam track 34 is laid out as a line 50 and one of the heads 22, 24 or 26 is shown at various points in its travels in relation to the guide through 46. As shown, the head in position 1 is about to engage a maximum sized log in the trough 46. In this position, the head is extended a maximum distance from the drum 12. As the drum rotates, the cam follower 42 moves along cam 34 or line 50 in region 54 to position 2 where the periphery of the head passes the bottom 52 of the trough 46. The slope of cam 34 or line 50 in this region 54 is determined by the width of the cutting face of the heads and the arcuate length of the cutting segment. The cutting segment is defined as extending from the point of entry of the knives into the largest diameter log to be processed to a point directly following the final cut in a log. After this final cut, the slope of cam 34 may be increased as at 55 to quickly retract the head and clear the knives. When the head has cleared the bottom of the trough position 3), it may be returned to its extended position 4 and then 5. Positions 5 and 1 are extended from drum 12 the same distance and thus the head will hold this distance until it reaches position 1 again. This extending movement corresponding to section 56 on line 50 or cam 34 may take place any time between the time the head passes the bottom of the trough (position 3) and the position in which it will engage the maximum diameter log (position 1).

Thus, with applicant's disclosed waferer the cutting head advances with the log while at the same time, rotating about an axis moving transversely to the log. With this system, a log may be continuously fed and reduced into wafers.

It will be noted that though applicant has disclosed synchronous motor drives for the heads, other drives may also be used. For example, the drum 12 may be driven from a power source and the shafts 28, 30 and 32 may be provided with gears that mate with a stationary gear concentric with the axle 14 to form a planetary arrangement of gears.

Any suitable means may be provided to advance the logs or wood to be cut along the trough 46 and to the waferer. The only requirement being that it be controllable to feed at the required rate. Slightly overfeeding the log to the drum will do no harm as long as one of the heads is continuously in engagement with the log being cut.

Applicant has shown all of the heads in close relationship with one another to provide maximum efficiency. It is also possible to space the heads more than as shown.

While three heads have been shown in the present embodiment, any number of heads may of course be used. If a single head is used, a quick return mechanism would be advantageous to return the head to the initial cutting position or position 1 of FIG. 3.

I claim:

1. In a waferer at least one rotatable wafering head, means to rotate said head, means to feed logs axially to said head, means to move said head transversely of said logs, and further means to move said head axially with said logs while said head is in engagement with said log.

2. In a device for cutting wood chips, at least one rotatable cutting head, means to rotate said head, means to feed wood to said head, said head being mounted for movement both transversely and parallel to the direction of movement of said wood and means to move said head in said transverse and parallel directions.

3. In a chipper, at least one rotatable cutting head, means to rotate said head, means mounting said head, said mounting means being rotatable about a fixed axis, means to rotate said mounting means about said fixed axis to move said head through an arc, means to move said head axially as it travels through said arc and means to feed logs axially to be engaged by said head in one segment of its travel through said arc, said log and said head advancing together during the movement of said head through said segment.

4. In a chipper, a drum mounted to rotate about a fixed axis, means to rotate said drum, at least one chipping head mounted on said drum for rotation on a shaft parallel to but spaced radially from said fixed axis, means to rotate said head, separate means to move said head axially, means to feed a log axially along a fixed path parallel to said fixed axis, said drum rotating to move said head transversely to said log, said head rotating to cut said log while simultaneously moving axially with said log.

5. In a chipper, a drum, means to rotate said drum about a fixed axel, at least one cutting head rotatably mounted on said drum on an axis parallel to but spaced from said fixed axel, means to rotate said head, means to move said head axially on said axis, means to feed a log longitudinally toward said drum along a path intersecting the path of movement of said head as said head moves with said drum, said head while rotating engaging and moving transversely to and axially with said log to reduce said log to wafers.

6. In a waferer, means to continuously advance a log longitudinally, a plurality of rotatable wafering heads mounted to move transversely to and axially with said advancing log to consecutively engage and reduce said log to wafers, first means to rotate each of said heads, second means to move said heads transversely to said log and third means to move said heads longitudinally with said log while each head is in engagement with said log.

7. In a waferer, a drum, means to rotate said drum about a fixed axel, at least one wafering head mounted on said drum rotatable on an axis spaced radially from said fixed axel, means to rotate said head, a plurality of knives mounted on the periphery of said head, means to reciprocate said head axially toward and from one face of said drum, means to feed logs to be reduced longitudinally toward said face of said drum, said means to reciprocate said head being coordinated with said feed means to move said head toward said drum at the same speed said log is advancing while said head is in engagement with said log, and to return said head to a position remote from said drum face during at least a portion of the remainder of the travel of said head with said drum.

8. A waferer as defined in claim 7 wherein said means to reciprocate includes a cam, a cam follower engaging said cam, means connecting said cam follower with said head to move said head in accordance with the movement of said cam follower.

9. A waferer as defined in claim 7 wherein said means to feed logs is driven at a fixed ratio to the rotation of said drum and the rate of reciprocation of said head is determined through said means to reciprocate by the speed of rotation of said drum.

10. A method of wafering which includes continuously advancing a log longitudinally, engaging the surface of said log adjacent the leading end of said log with knife means rotating on an axis parallel to the longitudinal axis of said log, advancing said knife with said log as said log moves longitudinally and simultaneously moving said knife means transversely of said log to reduce the section of said log engaged by said knife means to wafers.

11. An apparatus for wafing a random length log including knife means mounted for rotation about and reciprocation along a first axis, said first axis being mounted for movement about a second axis, means for feeding a log into engagement with said knife means, means for moving said knife means axially of said first axis at the rate of advance of said log, means to rotate said knife means about said first axis and means to rotate said first axis about said second axis.

12. An apparatus as defined in claim 11 wherein said means to rotate said first axis about second axis directly controls the rate of feed of said log and the rate of movement of said knife means axially of said first axis.

References Cited by the Examiner

UNITED STATES PATENTS

| | | | |
|---|---|---|---|
| 1,690,209 | 11/1928 | Smith | 83—490 X |
| 2,692,645 | 10/1954 | Driesch | 83—490 X |

WILLIAM W. DYER, Jr., *Primary Examiner.*

W. D. BRAY, *Assistant Examiner.*